Patented Sept. 27, 1932

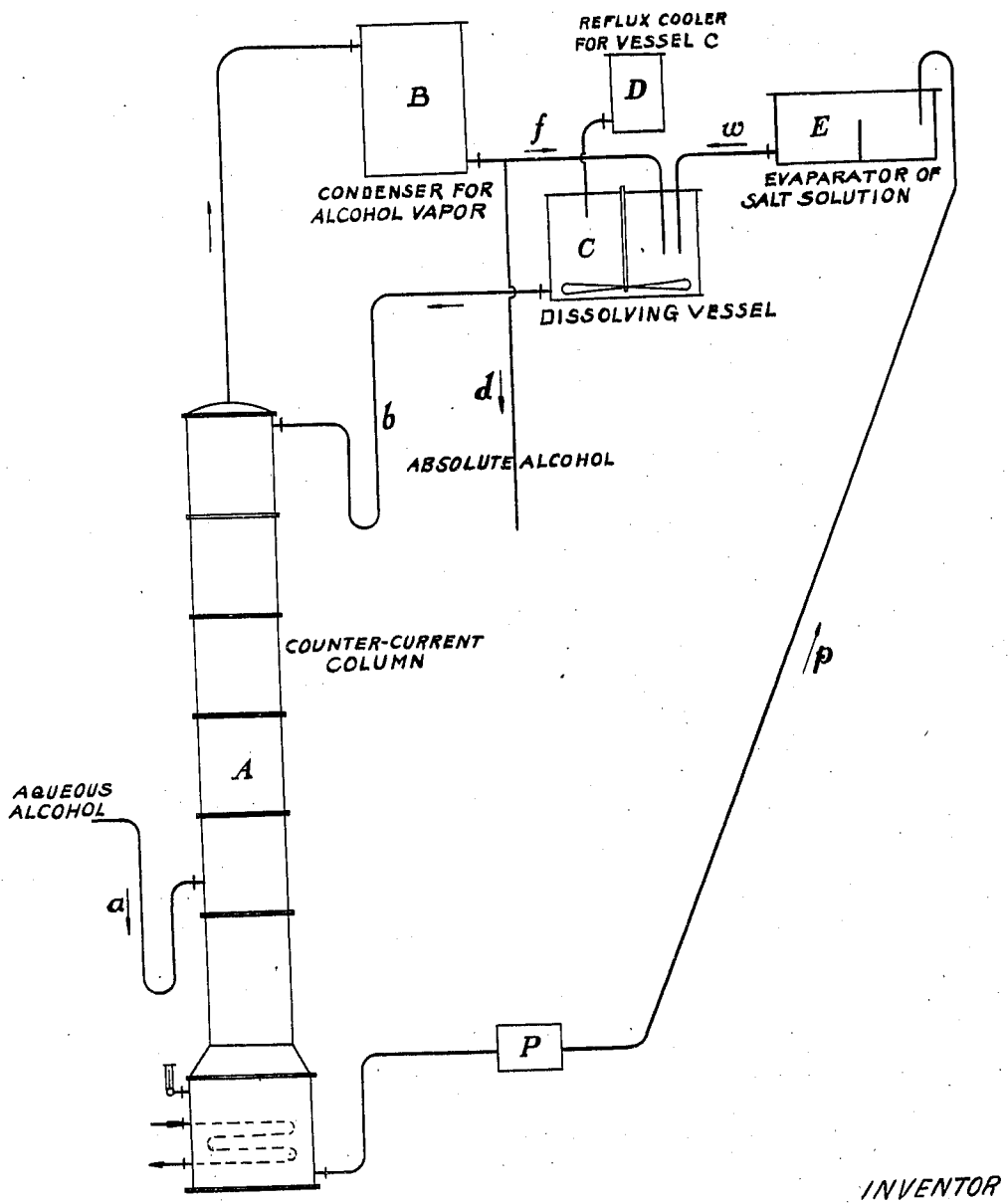

1,879,847

UNITED STATES PATENT OFFICE

ADOLF GORHAN, OF LIESING, NEAR VIENNA, AUSTRIA

PRODUCTION OF WATERFREE ETHYL ALCOHOL

Application filed September 8, 1930, Serial No. 480,576, and in Germany September 9, 1929.

It is well known to use water abstracting substances, particularly hygroscopic salts, for the production of absolute alcohol. Most of the suggestions made hitherto depend upon either adding the salt to the dilute alcohol and then distilling the mixture, or conducting the vapors of the dilute alcohol over the solid salt. It has also been suggested for removing water from alcohol to use a concentrated aqueous solution of hygroscopic salts.

These processes, however, have various disadvantages. The addition of hygroscopic salts to dilute (watery) alcohol and the subsequent distillation is only applicable in the discontinuous process but not in a continuous process. If the salts in solid form are allowed to move as a counter current to the vapors of the watery alcohol then the movement of these salts causes considerable difficulties. As long as they are still solid it is necessary to move them by means of conveyor worms or similar comparatively inconvenient means, whilst after taking up some of the water they mostly form a tough mass which may easily lead to stoppages in the apparatus. On the other hand when using the salts in the form of concentrated aqueous solutions it will be understood that the entire water-binding power of the salts cannot be utilized completely.

It has been found that these difficulties may be overcome by utilizing as the water abstracting agent water-abstracting fusible salts capable of passing from the state of aqueous solution direct to the fused or anhydrous or substantially anhydrous molten state. The process, therefore, according to the present invention consists in submitting the aqueous alcohol in vapour form and on the counter-current principle to the action of such a salt either dissolved in its fused or molten state in absolute alcohol before entering the column in which the counter-current action occurs or supplied in the fused or molten state direct to the column wherein it dissolves in the ascending alcohol, the dehydrated alcohol being condensed and the aqueous salt solutions being driven by heat back to its fused or molten state for re-use.

It will be understood that as water-removing substances there only come into question those fusible salts which dissolve in absolute alcohol and pass from the aqueous solution state direct to the fused or molten state. Many known dehydrating media as for example calcium carbonate, copper sulphate, calcium oxide, etc. do not come into question. The process, however may be carried into effect, for example with calcium chloride, sodium sulphide, magnesium chloride, magnesium nitrate, etc. In this connection potassium acetate has been found particularly suitable.

The operation is preferably carried out in a column. The vapors of the aqueous alcohol stream oppositely against a preformed solution of the water removing salt in absolute alcohol. At the top there distills over absolute alcohol, whilst in the lower portion of the column, preferably heated to 120° C., there collects a dilute salt solution which no longer contains alcohol. The dilute salt solution is withdrawn, driven by heat from the aqueous solution state to the fused or molten state, and then, is again dissolved in absolute alcohol.

In the apparatus shown in the accompanying drawing the alcol 1 to be dehydrated flows through the pipe $a$ into the lower third of a column A, which at the bottom contains a heating coil and is sprayed from the top through the pipe $b$ with a concentrated waterfree solution of potassium acetate in absolute alcohol. The completely dehydrated alcohol vapors leaving the column are condensed in the cooler B. The condensed alcohol leaves the plant partly as final product through the pipe $d$, and partly is conducted, for forming the spraying liquid, through the pipe $f$ into the dissolving vessel C provided with agitating mechanism and return flow (reflux) cooler D. The vapors from the dissolving vessel C go to the reflux cooler D and then when condensed flow back into the dissolving vessel C. The potassium acetate solution charged with water is completely freed from alcohol in the lower part of the column A by the action of the heating coil (at about 120° C.) and conveyed by the pump P and piping $p$ into the evaporating pan E, where the water is completely evaporated. The melted water-free potassium acetate flows through pipe $w$ into the dissolving vessel C where it is dissolved in water-free alcohol from the cooler B, whereupon it is returned into the column A through the pipe $b$.

What I claim is:—

1. Process for the production of water-freed ethyl alcohol from aqueous alcohol by means of water-abstracting salts, comprising treating the aqueous alcohol in vapor form on the countercurrent principle to the action of a solution in absolute alcohol of a fusible water-abstracting salt capable of passing directly from the state of aqueous solution to the molten state, driving the resultant aqueous salt solution by heat to its substantially anhydrous and at the same time molten state and dissolving the molten salt in absolute alcohol for re-use in the process.

2. Process for the production of water-freed ethyl alcohol from aqueous alcohol by means of water-abstracting salts, comprising treating the aqueous alcohol in vapor form on the countercurrent principle to the action of a solution in absolute alcohol of a fusible water-abstracting salt capable of passing directly from the state of aqueous solution to the molten state, driving the resultant aqueous salt solution by heat to its substantially anhydrous and at the same time molten state, condensing the water-freed alcohol vapor and dissolving the molten salt in a portion of the condensed water-freed alcohol vapor for re-use in the process.

3. Process for the production of water-freed ethyl alcohol from aqueous alcohol by means of potassium acetate, comprising causing the aqueous alcohol in vapor form to ascend in contact with a solution of potassium acetate in absolute alcohol in the form of a descending spray, driving the resultant aqueous potassium acetate to its substantially anhydrous and at the same time molten state, condensing the water-freed alcohol, dissolving the molten acetate in a portion of the condensed alcohol and utilizing it as spraying liquid in the process.

4. Process for the production of water-freed ethyl alcohol from aqueous alcohol by means of water-abstracting salts, comprising introducing the aqueous alcohol in vapor form into the lower part of a column, spraying into the top of the column a solution in absolute alcohol of a fusible water-abstracting salt capable of passing directly from the state of aqueous solution to the molten state, leading off the water-freed alcohol vapor from the top of the column and condensing the same, conducting away the aqueous salt solution from the foot of the column, driving the same by heat from its aqueous condition to its substantially anhydrous and at the same time molten state, running the molten salt and also a portion of the condensed alcohol into admixture with one another and returning the solution of the salt in the alcohol to the top of the column.

5. Process for the production of water-freed ethyl alcohol from aqueous alcohol by means of potassium acetate, comprising introducing the aqueous alcohol in vapor form into the lower part of a column, spraying into the upper part of the column a solution of potassium acetate in absolute alcohol, leading off the water-freed alcohol vapor from the top of the column and condensing the same, conducting away the aqueous solution of potassium acetate from the foot of the column, driving the potassium acetate solution from its aqueous state to its substantially anhydrous and at the same time molten state, running the molten salt and a portion of the aforesaid condensed alcohol vapor into admixture with one another, and returning the resultant solution of the potassium acetate in the alcohol to the upper part of the column.

In testimony whereof I have signed my name to this specification.

ADOLF GORHAN.